(No Model.)
F. O. DESCHAMPS.
FRICTION CLUTCH.
No. 268,463.  Patented Dec. 5, 1882.
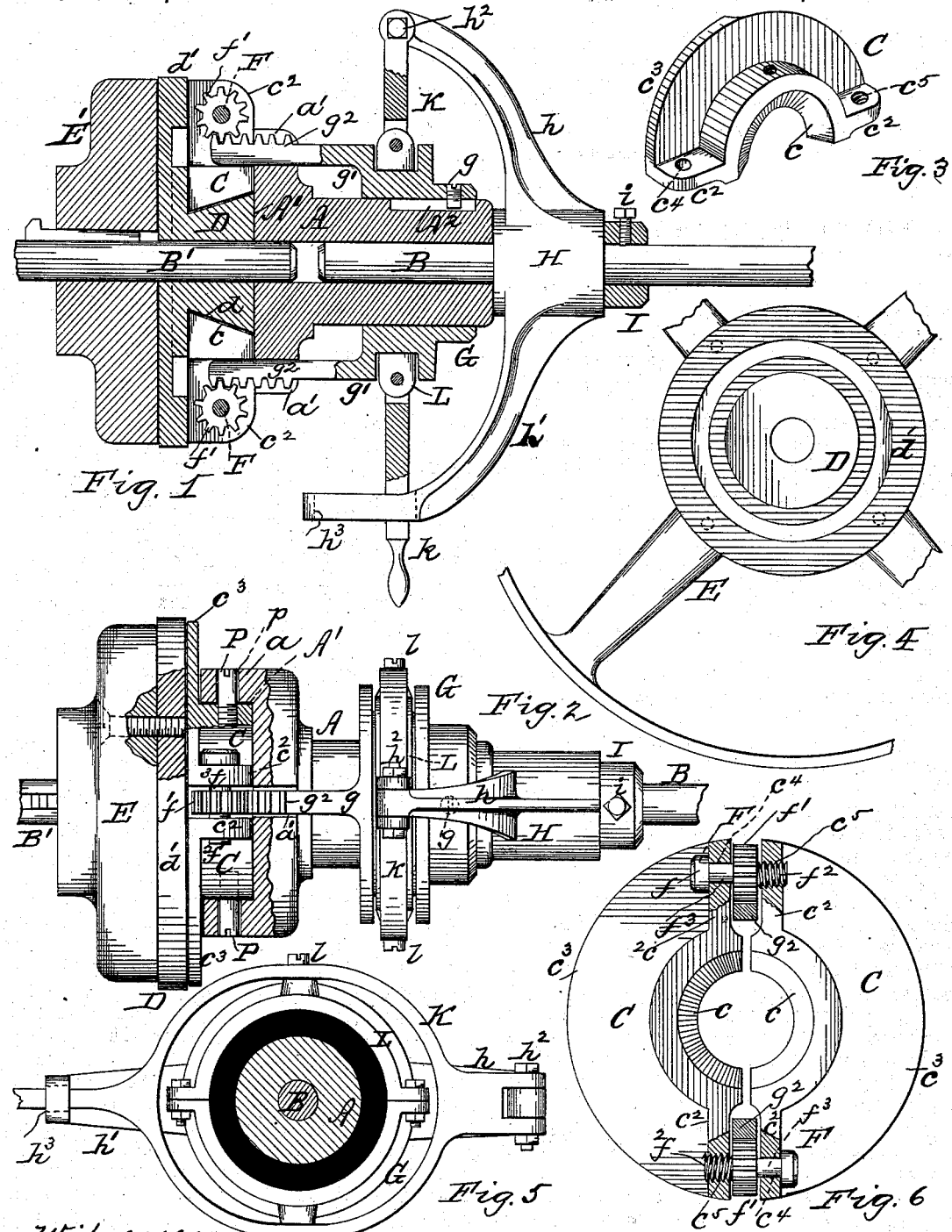
Witnesses:
Chas. F. Van Horn
Edwin Paramore
Inventor
Francis O. Deschamps
By S. J. Van Stavoren
Attorney

UNITED STATES PATENT OFFICE.

FRANCIS O. DESCHAMPS, OF PHILADELPHIA, PENNSYLVANIA.

FRICTION-CLUTCH.

SPECIFICATION forming part of Letters Patent No. 268,463, dated December 5, 1882.

Application filed May 1, 1882. (No model.)

*To all whom it may concern:*

Be it known that I, FRANCIS O. DESCHAMPS, a citizen of the United States, residing at Philadelphia, in the county of Philadelphia and State of Pennsylvania, have invented certain new and useful Improvements in Friction-Clutches, of which the following is a specification, reference being had therein to the accompanying drawings, wherein—

Figure 1 represents a longitudinal section, partly in elevation, of my improved friction-clutch; Fig. 2, an elevation, partly sectional, of the same. Fig. 3 is a perspective of one of the clutch-shoes. Fig. 4 is a broken elevation of hub and loose wheel. Fig. 5 is an elevation of shifting-lever and collar, the latter being in section; and Fig. 6 is an elevation of the clutch-shoes, partly sectional, with connecting screws, pinions, and racks.

My invention has for its object to provide an improved friction-clutch; and it consists in the novel combination, construction, and arrangement of parts, having reference to the employment of rack-and-pinion mechanism for effecting the engagement and release of the friction-shoes or clutching devices.

Referring to the accompanying drawings, A represents a sleeve designed to be rigidly secured to a shaft, B. Said sleeve is provided with an annular rim, $a$, which is diametrically recessed or cut away at $a'$ $a'$.

C C represent the clutch-shoes, which are of a substantially semi-cylindrical form, having inner tapering sides, $c\, c$, lugs $c^2\, c^2$, and flanges $c^3\, c^3$. Said shoes are placed within the chamber $A'$, formed by the sleeve-rim $a$, with their lugs $c^2\, c^2$ projecting through the recesses $a'\, a'$, and the flanges $c^3\, c^3$ standing outside of said rim, as shown. One of the lugs $c^2$ of each shoe has a plain or smooth opening, $c^4$, and the remaining lug of each shoe is provided with a threaded opening, $c^5$. Said shoes are so arranged within chamber $A'$ as to have the lugs with the smooth openings $c^4$ opposed to or paired with the lugs having the threaded openings $c^5$, as shown in Fig. 6.

D represents a hub, its periphery $d$ tapering to correspond with the inclination of the sides $c\, c$ of the shoes C, to provide a clutching-surface for said sides. Said hub has a flange, $d'$, by means of which the hub is secured to a wheel or pulley, E, as shown in Fig. 4, which is designed to be loosely mounted on a shaft to form the clutch-pulley; or said hub may be thereby attached to a collar, $E'$, firmly secured to a cut-off shaft, $B'$, as illustrated in Fig. 1.

F F represent pins or bolts, having heads $f$, pinions $f'$, and screw or threaded ends $f^2$. These bolts connect to each pair of the lugs $c^2\, c^2$ of the shoes C C, as shown in Fig. 6—i. e., the smooth parts $f^3$ of the bolts pass through the plain openings $c^4\, c^4$ of said lugs, while the screw-ends $f^2$ thereof engage with the threaded openings $c^5$ of the opposed lugs. The effect of such construction is that when the pinions $f'$ are rotated in one direction the shoes C C are simultaneously drawn together, and are in like manner separated from each other when said pinions are reversely rotated.

G represents a sliding-collar mounted on the sleeve A, and is provided with a screw or pin, $g$, which enters an elongated slot, $A^2$, in said sleeve, whereby said collar is caused to revolve with the sleeve. The collar G has arms $g'\, g'$ formed thereon or secured thereto, carrying racks $g^2\, g^2$, which engage with the pinions $f'\, f'$, as indicated in Fig. 1.

H represents a loose hub on shaft B, held in place by collar I and set-screw $i$. Said hub is provided with arms $h\, h'$. To the arm $h$ is pivoted at $h^2$ the shifting-lever K. The handle end $k$ of said lever passes through a slot, $h^3$, in arm $h'$, as shown. Said lever is secured at $l\, l$ to the usual band, L, surrounding the collar G.

The operation is obvious. As the lever K is shifted to the left the collar G with racks $g^2$ are slid in the same direction. The pinions $f'\, f'$ are rotated and cause the shoes C C to approach each other until they effect a clutch-engagement with the hub D. At the same time the shoes C C are moved longitudinally by the pressure or strain of the moving-racks against said pinions until the flanges $c^3\, c^3$ of the shoes effect a clutch-engagement with the flange $d'$ of hub D, thereby obtaining an increased area of clutching-surface for said shoes. Upon returning the lever K to its normal position the pinions $f'$ are reversely rotated to effect a disengagement of said parts.

It will be noticed that the sleeve A has all the parts of the clutch secured to or placed thereon, so that a very compact clutch is obtained, and which occupies but little space upon the shaft.

The provision of the flanged hub and shoes increases the area of clutching-surface between said parts over and above that that could be obtained if said flanges be dispensed with.

The same means and power employed to effect the clutch-engagement are also used to release the same, thereby dispensing with springs and other similar devices heretofore provided for that purpose. Hence, in my improved clutch, there is no liability of the shoes C C "setting" upon hub D when clutch-engagement between said parts is effected.

I have shown and described the shoes C C and hub D as having correspondingly tapered or inclined sides; but, if desired, said sides may be formed of an even thickness or with straight sides.

If desired, pins P P, working in slots $p$ $p$ of sleeve-rim $a$, may be employed for retaining the shoes C C in chamber A' of sleeve A, said pins also serving to relieve the lugs $c^2$ $c^2$ of undue strain, which might otherwise fall thereon if said pins be not used.

What I claim is—

1. In a friction-clutch, a sleeve rigidly secured to the driving-shaft and constructed, substantially as shown and described, to form a bearing or chamber for the clutch-shoes, and a seat for the sliding collar carrying mechanism for operating said shoes, substantially as set forth.

2. In a friction-clutch, the combination, with the clutching shoes carrying pinions, of a sliding collar provided with racked arms to engage with said pinions, substantially as shown and described.

3. The combination, with a hub, D, of shoes C C, having pinions $f'$ $f'$, sleeve A, collar G, having racks $g^2$ $g^2$, substantially as shown and described.

4. The friction-clutch shoe C, having lugs $c^2$ $c^2$, one of which is provided with a plain or smooth opening, $c^4$, and the other with a threaded opening, $c^5$, substantially as shown and described.

5. The combination of sleeve A, shoes C C, constructed substantially as shown and described, the pins F, having pinions $f'$, and collar G, with racks $g'$, substantially as set forth.

6. In a friction-clutch, the combination of the following elements: a sleeve adapted and designed to receive the friction or clutching shoes and a sliding collar, said shoes being connected by pins carrying pinions, and said collar having racks to engage with said pinions, substantially as shown and described.

7. The friction-clutch shoe C, having lugs $c^2$ $c^2$, with smooth and threaded openings $c^4$ $c^5$ and flange $c^3$, substantially as shown and described.

8. In a friction-clutch, the combination, with the clutching-shoes C C, flanged at $c^3$, the hub D, flanged at $d'$, of a carrier for said shoes, and mechanism for causing said shoes to clutch with said hub, substantially as shown and described.

9. In combination with shoes C C, having lugs $c^2$ $c^2$, with opposed plain and threaded openings, the pins F F, having smooth parts $f^3$ and threaded ends $f^2$ $f^2$, substantially as shown and described.

In testimony whereof I affix my signature in presence of two witnesses.

FRANCIS O. DESCHAMPS.

Witnesses:
S. J. VAN STAVOREN.
CHAS. F. VAN HORN, Jr.